(12) United States Patent
Glemba, Jr.

(10) Patent No.: US 8,252,101 B1
(45) Date of Patent: Aug. 28, 2012

(54) METHOD AND COMPOSITION FOR POLISHING SURFACES

(76) Inventor: Roman A. Glemba, Jr., Brighton, CO (US)

( * ) Notice: Subject to any disclaimer, the term of this patent is extended or adjusted under 35 U.S.C. 154(b) by 0 days.

(21) Appl. No.: 13/294,850

(22) Filed: Nov. 11, 2011

(51) Int. Cl.
*C09G 1/04* (2006.01)
*C09G 1/14* (2006.01)
*C09G 1/16* (2006.01)
*C09G 1/18* (2006.01)

(52) U.S. Cl. ........... 106/11; 106/3; 427/355; 427/372.2; 427/387; 510/268; 510/400

(58) Field of Classification Search ................ 106/3, 11; 427/355, 372.2, 387; 510/268, 400
See application file for complete search history.

(56) References Cited

U.S. PATENT DOCUMENTS

| 4,293,339 A | 10/1981 | Supcoe |
| 5,254,606 A | 10/1993 | Mikami et al. |
| 5,330,787 A | 7/1994 | Berlin et al. |
| 6,159,551 A | 12/2000 | Yeiser et al. |
| 6,562,114 B1 | 5/2003 | Yeiser et al. |
| 7,001,463 B2 | 2/2006 | Jones |
| 7,381,249 B2 | 6/2008 | Hasinovic et al. |
| 7,399,738 B1 | 7/2008 | Serobian |
| 2004/0110850 A1 | 6/2004 | Jordan et al. |
| 2009/0053419 A1 | 2/2009 | Ostroff et al. |

OTHER PUBLICATIONS http://tech-shine.com/products/.
http://www.carpages.co.uk/news/autoglym-25-02-07.asp.
http://www.eagleone.com/pages/products/product.asp?itemid=1091.

*Primary Examiner* — Anthony J Green
(74) *Attorney, Agent, or Firm* — Marc E. Hankin; Kevin Schraven; Hankin Patent Law, APC

(57) ABSTRACT

The invention is a method and composition for polishing a wet surface. The invention is a water based composition for polishing wet surfaces and a method of applying the water based composition to polish wet surfaces. The method does not include a dry to haze or buffing step in order to achieve a lasting high gloss shine on the polished surface.

19 Claims, No Drawings

METHOD AND COMPOSITION FOR POLISHING SURFACES

FIELD OF INVENTION

This invention relates to the method and composition for polishing surfaces. More particular, the invention relates to a high water based composition for polishing wet surfaces and a method of applying the water based composition to polish wet surfaces that requires no buffing. The composition are easily applied and removed from surfaces, especially vehicle surfaces, with minimal wiping, leaving a dust-free, streak-free, and glossy finish.

BACKGROUND

For decades, people have used various wax and silicone compositions to wax surfaces, such as the painted surface of a car. After the painted surface is washed and dried, waxes are typically applied to the surface by spraying, squirting, or rubbing the wax onto a freshly cleaned, dried, and cooled surface. The wax is preferably applied using a circular motion and is left dry to a haze. The haze is then removed by buffing the surface with a clean soft towel. This type of buff waxing is very time consuming and labor intensive.

Although quick wax jobs are obtainable in an automatic or semi-automatic car-wash, where the car-wash liquid wax may be sprayed onto the vehicle and dried using an air blower subjected to a blow dry step, such applications do not provide long lasting satisfactory results. Such wax formulations applied during a carwash do not provide the type of high-gloss finish that may be obtained through the standard circular buffing method.

Additionally, conventional polish compositions utilized for vehicular surfaces, especially automotive paint surfaces, typically are time consuming when applying and contain an abrasive component. For example, U.S. Pat. No. 4,398,953 discloses an improved silicone containing a polish, montan wax, emulsifier, silicone oil, amino silicones, finely divided abrasive, water and a volatile aliphatic hydrocarbon liquid; wherein the hydrocarbon liquid evaporates three to five times faster than water. The polish composition is applied to the vehicle's surface, allowed to dry to a haze, and then buffed off. The labor and effort in applying these polishes has discouraged many consumers from using these products.

Similarly, U.S. Pat. No. 6,551,974, discloses both a composition and method for creating a glossy or shiny finish on a hard surface. The composition of one embodiment comprises a base polish and at least one poly[oxyalkyline]ammonium cationic surfactant, which provides an improved gloss/shine. The composition also further comprised of polishing agent abrasives to remove contaminants. However, when applied to painted surfaces, which also takes substantial time and effort, the abrasives reduce the paint layer thickness and require extensive buffing for removal.

Therefore, what is needed is a composition and method of waxing to provider users the ability to apply, and wipe off, the composition to a wet vehicle with little or no buffing, resulting with a shine that has a long lasting, high-gloss finish and without any abrasives that reduce the paint surface thickness.

SUMMARY OF THE INVENTION

To minimize the limitations in the prior art, and to minimize other limitations that will become apparent upon reading and understanding the present specification, the present invention is an method and composition of polishing a surface, wherein the surface is wet and the polish does not have to remain on the surface until hazing.

One embodiment of the invention is a polishing composition comprising: an aliphatic hydrocarbon compound in an amount of from 5.0 to 30.0 percent by weight based on a total weight of the composition; an octamethylcyclopentasiloxane in an amount of from 2.0 to 10.0 percent by weight based on a total weight of the composition; an decamethylcyclopentasiloxane in an amount of from 2.0 to 10.0 percent by weight based on a total weight of the composition; an polydimethylsiloxane in an amount of from 0.5 to 4.0 percent by weight based on a total weight of the composition; an amino alkoxy polydimethylsiloxane in an amount of from 0.1 to 2.0 percent by weight based on a total weight of the composition; an ethoxylated fatty alkanolamide in an amount of from 0.1 to 2.0 percent by weight based on a total weight of the composition; and water in an amount of from 45 to 90 percent by weight based on a total weight of the composition. Preferably, the polishing composition further comprises a dye in an amount from 0.1 to 2.5 percent by weight based on a total weight of the composition, a fragrance in an amount from 0.1 to 2.5 percent by weight based on a total weight of the composition; and/or a preservative in an amount from 0.1 to 2.5 percent by weight based on a total weight of the composition. Preferably, the aliphatic hydrocarbon compound is comprised of one or more petroleum distillates. Preferably, the petroleum distillates may be straight chain hydrocarbons and/or cyclic hydrocarbons, and they typically have between nine and seventeen carbons. Preferably, the aliphatic hydrocarbon compound, the octamethylcyclopentasiloxane, and the decamethylcyclopentasiloxane preferably provide solubilization of the polydimethylsiloxane and the amino alkoxy polydimethylsiloxane. The surface polished is preferably wet. Preferably, the aliphatic hydrocarbon compound, the octamethylcyclopentasiloxane, and the decamethylcyclopentasiloxane evaporate after application to the polished surface, which leaves the polydimethylsiloxane behind on the polished surface as a liquid, which then fills in the microcrevices on the polished surface. Preferably, the aliphatic hydrocarbon compound, the octamethylcyclopentasiloxane, and the decamethylcyclopentasiloxane also act to reduce friction during application of the polishing composition to the surface. Preferably, the ethoxylated fatty alkanolamide is used as an emulsifier.

Another embodiment of the invention is a method of polishing a wet surface, comprising the steps: providing a clean wet surface; providing a wet polisher; removing an excess water from the wet polisher; applying a polish to the wet polisher; rubbing the polish into the clean wet surface; drying the clean wet surface with a drying implement. The polish is preferably comprised of: an aliphatic hydrocarbon compound in an amount of from 5.0 to 30.0 percent by weight based on a total weight of the polish; an octamethylcyclopentasiloxane in an amount of from 2.0 to 10.0 percent by weight based on a total weight of the polish; an decamethylcyclopentasiloxane in an amount of from 2.0 to 10.0 percent by weight based on a total weight of the polish; an polydimethylsiloxane in an amount of from 0.5 to 4.0 percent by weight based on a total weight of the polish; an amino alkoxy polydimethylsiloxane in an amount of from 0.1 to 2.0 percent by weight based on a total weight of the polish; an ethoxylated fatty alkanolamide in an amount of from 0.1 to 2.0 percent by weight based on a total weight of the polish; and water in an amount of from 45 to 90 percent by weight based on a total weight of the polish. Preferably, the aliphatic hydrocarbon compound is comprised of one or more petroleum distillates. Preferably, the one or more petroleum distillates are selected from the group consisting of straight chain hydrocarbons and cyclic hydrocarbons. Preferably, the one or more petroleum distillates have between nine and seventeen carbons. Preferably, the aliphatic hydrocarbon compound, the octamethylcyclopentasiloxane, and the decamethylcyclopentasiloxane provide solubilization of the polydimethylsiloxane and the amino alkoxy polydimethylsiloxane. Preferably, the aliphatic hydrocarbon compound, the octamethylcyclopentasiloxane, and the decamethylcyclopentasiloxane evaporate after application to the polished surface, and the polydimethylsiloxane remains on a polished surface as a liquid and fills in a plurality of microcrevices on the polished surface. Preferably, the aliphatic hydrocarbon compound, the octamethylcyclopentasiloxane, and the decamethylcyclopentasiloxane reduce friction during application of the polish to the wet surface. Preferably, the ethoxylated fatty alkanolamide is an emulsifier. The polish may also include a dye in an amount from 0.1 to 2.5 percent by weight based on a total weight of the polish, a fragrance in an amount from 0.1 to 2.5 percent by weight based on a total weight of the polish, and a preservative in an amount from 0.1 to 2.5 percent by weight based on a total weight of the polish.

The present invention is a polishing, or wax, composition that is preferably used to polish surfaces of painted metal, painted plastic, stainless steel, rubber surfaces, vinyl, chrome, plastic moldings, and fiberglass.

The method of applying the polish preferably includes the steps of: providing a wet surface; providing a damp towel; applying the polishing wax composition to the damp towel; rubbing polishing wax onto the wet surface; and drying the wet surface with a clean towel. The instant formulation is readily applied to a wet surface, which has typically been rinsed after washing.

It is an object of the present invention to overcome the limitations of the prior art.

Another object of the present invention to provide a polish composition that allows users to polish wet surfaces without having to buff or wait for the polish to dry to a haze. In particular, the polish composition should be easily applied and should require minimal effort to wipe out to a thin, glossy, and streak free film. The present invention provides the user with no waiting period for the polish to dry without any residue formation.

Another object of the present invention is to provide a composition that is simple and easy to prepare.

Another object of the present invention is to provide a composition that reduces the chances of abrasions forming on the polished surface.

Additional embodiments of the invention will be understood from the detailed description of the invention.

DETAILED DESCRIPTION OF THE INVENTION

In the following detailed description of various embodiments of the invention, numerous specific details are set forth in order to provide a thorough understanding of various aspects of one or more embodiments of the invention. However, one or more embodiments of the invention may be practiced without some or all of these specific details. In other instances, well-known methods, procedures, and/or components have not been described in detail so as not to unnecessarily obscure aspects of embodiments of the invention.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the screen shot figures, and the detailed descriptions thereof, are to be regarded as illustrative in nature and not restrictive. Also, the reference or non-reference to a particular embodiment of the invention shall not be interpreted to limit the scope of the invention.

The present invention is aimed in reducing the labor and time of providing a glossy finish to a painted vehicle's exterior by combining the steps of drying and buffing into a single step of operation. After using conventional cleaning agents such as water and detergents, the wax composition of the present invention is applied to a wet surface, wherein the wet surface is then wiped with a cloth or the an equivalent absorbent material while doing so the waxed surface is buffed. As such, the additional step in rinsing and drying eliminated, thereby reducing the amount of labor and time in performing a polishing wax operation.

Table 1 shows a preferred composition of one embodiment of the invention. The ingredients are mixed to create a substantially liquid polish that is most effective if applied to a clean wet car. The Table also lists the preferred weight (Wt) percentage (%) range of each ingredient and the primary purpose of the ingredient.

TABLE 1

| Ingredient | Preferred Wt % Range | Purpose |
| --- | --- | --- |
| aliphatic hydrocarbon compound | 5.0 to 30.0 | Silicone Solubilizer |
| octamethylcyclopentasiloxane | 2.0 to 10.0 | Solubilizer, Thinner, Friction Reducer |
| decamethylcyclopentasiloxane | 2.0 to 10.0 | Solubilizer, Thinner, Friction Reducer |
| polydimethylsiloxane | 0.5 to 4.0 | Friction Reducer and Gloss Agent |
| amino alkoxy dimethylpolysiloxane | 0.1 to 2.0 | Paint Bonding Agent and Gloss Agent |
| ethoxylated fatty alkanolamide | 0.1 to 2.0 | Water Displacement Emulsifier |
| water | 45 to 90 | Solvent/Carrier |
| Dye/fragrance/preservative | 0.1 to 2.5 | |

Aliphatic hydrocarbon compound is added to function as a silicone solubilizer for forming a homogeneous solution of the polish composition. Preferably, the aliphatic hydrocarbon component is in an amount up to 30.0 percent by weight, and more preferably between 5.0 to 30.0 percent by weight. One particular preferred embodiment contains about 14.0 percent by weight based on the total weight percent of the composition. The aliphatic hydrocarbon compound is typically comprised of one or more petroleum distillates, which may be straight chain hydrocarbons and/or cyclic hydrocarbons, and typically have between nine and seventeen carbons. Examples of such aliphatic hydrocarbon compounds include without limitation mineral spirits, dipentene, naphtha, Stoddard solvent, kerosene, cycloaliphatic hydrocarbons, and terpenes such as pine oil and turpentine.

The aliphatic hydrocarbon compound component of the polish composition typically has the formula $C_nH_{2n+2}$ with the following structure:

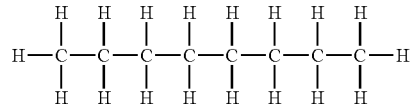

Octamethylcyclotetrasiloxane is a silicone component added to function as a solubilizer, thinner, and friction reducer for the polish composition. Preferably, the octamethylcyclotetrasiloxane component is in an amount up to 10.0 percent by weight, and more preferably between 2.0 to 10.0 percent by weight. One particular preferred embodiment contains about 7.76 percent by weight based on the total weight percent of the composition.

The octamethylcyclotetrasiloxane component of the polish composition typically has the formula $C_8H_{24}O_4Si_4$ with the following structure:

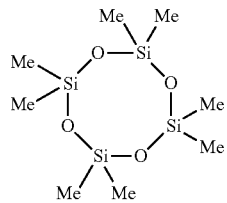

Decamethylcyclopentasiloxane is added also to function as a solubilizer, thinner, and friction reducer for the polish composition. Preferably, the decamethylcyclopentasiloxane component is in an amount up to 10.0 percent by weight, and more preferably between 2.0 to 10.0 percent by weight. One particular preferred embodiment contains about 5.13 percent by weight based on the total weight percent of the composition.

The decamethylcyclopentasiloxane component of the polish composition typically has the formula $C_{10}H_{30}O_5Si_5$ with the following structure:

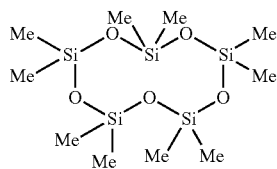

The aliphatic hydrocarbon compound, the octamethylcyclopentasiloxane, and the decamethylcyclopentasiloxane preferably provide solubilization of the silicon fluids, including polydimethylsiloxane and amino alkoxy polydimethylsiloxane, and they also act to reduce friction during application of the polish. Additionally, the aliphatic hydrocarbon compound, the octamethylcyclopentasiloxane, and the decamethylcyclopentasiloxane evaporate after application of the polish to the polished surface. This leaves the polydimethylsiloxane behind on the polished surface as a liquid, which fills in the microcrevices on the polished surface.

Polydimethylsiloxane (PDMS) is a silicone component added to function as a friction reducer and gloss agent for the polish composition. PDMS is specifically added to the composition to rub-out by acting as a lubricant. Preferably, the polydimethylsiloxane component is in an amount up to 4.0 percent by weight, and more preferably between 0.5 to 4.0 percent by weight. One particular preferred embodiment contains about 1.68 percent by weight, based on the total weight percent of the composition. Additionally, PDMS preferably has a kinematic viscosity in the range from about 50 to 100,000 centistoke ($mm^2/sec$), more preferably from 100 to 30,000 centistoke, and most preferably about 350 centistoke.

The PDMS component of the polish composition typically has the formula $CH_3[Si(CH_3)_2O]_nSi(CH_3)_3$ with the following structure:

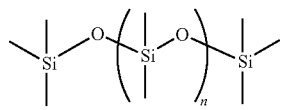

The amino alkoxy dimethylpolysiloxane, which is typically in the form of an aqueous emulsion, typically functions as a paint bonding and gloss agent. Preferably, the amino alkoxydimethylpolysiloxane component is in an amount up to 2.0 percent by weight, and more preferably between 0.1 to 2.0 percent by weight. One particular preferred embodiment contains about 0.62 percent by weight based on the total weight percent of the composition.

The amino alkoxy dimethylpolysiloxane component is typically intertwined with the silicone chains of the polydimethylsiloxane and binds to oxygen on the surface being polished where the wet surface being polished is typically a painted car. As the amino alkoxy dimethylpolysiloxane binds to the oxygen in the paint, the polish composition creates a long lasting shine. Without this binding, weathering tends to quickly remove the silicone polishing agent.

The ethoxylated fatty alkanolamide is used as an emulsifier and promotes the creating of small droplets of the solvents, which contain the silicone polishing agent. The emulsified small droplets of solvent are evenly dispersed in the water creating a substantially liquid stable and homogeneous polishing composition. The ethoxylated fatty alkanolamide also acts as a water displacement aid. The ethoxylated fatty alkanolamide has an affinity for low energy painted surfaces, which creates an even lower energy, which dispels the high energy water molecules. Preferably, the ethoxylated fatty alkanolamide component is in an amount up to 2.0 percent by weight, and more preferably between 0.1 to 2.0 percent by weight. One particular preferred embodiment contains about 0.5 percent by weight based on the total weight percent of the composition.

Majority of the polishing composition is water, which is added to the present invention to function as a low cost carrier for the polish. The water is preferably demineralized and deionized but is not particularly limited thereto. Preferably, the water is in an amount up to 90 percent by weight, and more preferably between 45 to 90 percent by weight. One particular preferred embodiment contains about 69.7 percent by weight based on the total weight percent of the composition.

It should also be understood that effective amounts of other compatible compositions such as dyes or colorants, fragrances, and preservatives may also be added to the polishing wax composition based on the total weight of the composition. For example, dyes may be added to provide a desirable color or tint to the polishing composition. Preferably, the dye is in an amount up to 0.025 percent by weight, and more preferably between 0.001 to 0.025 percent by weight. One particular preferred embodiment contains about 0.01 percent by weight based on the total weight percent of the composition. Examples of such dyes include without limitation natural dyes such as natural invertebrate dyes (e.g., Tyrian purple and crimson kermes) and plant-based dyes (e.g., wood, indigo, saffron, and madder) and synthetic dyes such as water-based dyes, acid dyes, basic dyes, direct dyes, and disperse dyes. Other colorants suitable for use in the present invention include barium chromate, cyanines, haematites, iron ferreites, lead chromes and silicochromates, liminites, magnetites, metalized azos such as barium or calcium salts, micaceous oxides of iron, naphitol, phtalocyanines, pigments such asmagnesium salts, Prussian blue, pyrazolnes, quinacridones, rhodamines, strontium chromate, titanium nickel yellow, and zinc chromes.

Effective amounts of one or more fragrances may be added to impart a favorable scent to the polishing composition. Preferably, the fragrance is in an amount up to 2.5 percent by weight, and more preferably between 0.1 to 2.5 percent by weight. One particular preferred embodiment contains about 0.5 percent by weight based on the total weight percent of the composition. Examples of such fragrances include without limitation vanilla, bubble gum, orange fruity bouquet, strawberry, caramel, cherry, vanilla, grapefruit, orange, coco, green apple, lily, tropical, lemon, papaya, pine, melon, lavender, lilac, jasmine, ocean, new car, peach, sandal wood, oak, green tea, green wood, coffee, mango, and the like may be added to the present invention to provide a desirable scent to the polishing wax composition.

Optionally, preservatives may also be included in the polish composition to prevent decomposition by microbial growth or any undesirable chemical changes. Preferably, the preservative is in an amount up to 0.25 percent by weight, and more preferably between 0.01 to 0.25 percent by weight. One particular preferred embodiment contains about 0.10 percent by weight based on the total weight percent of the composition. Preservatives useful in the present invention may include without limitation biocide and polymethoxbyicyclic oxazolidine. The preservatives listed above are exemplary, but each preservative should be evaluated on an trial basis in each formulation to assure compatibility and efficacy of the preservative. Methods for evaluating efficacy of preservatives are known to those skilled in the art.

Although specific compounds are listed in Table 1, it should be understood that equivalent compounds may be used including, but not limited to, non-toxic silicones, solvents, non-ionic surfactants, amino functional siloxanes, water based carriers, fungicides, UV absorbers, and moisturizers. Specifically, fungicides, UV absorbers, and moisturizers may be included in effective amounts of less than 1 percent by weight based on the total weight of the composition. For example, UV absorbers may include benzotriazoles and benzophenones.

The composition of the present invention may be made using a mixing process. The components of the composition, including the aliphatic hydrocarbon, octamethylcyclopentasiloxane, decamethylcyclopentasiloxane, polydimenthylsiloxane, aminoalkoxypolydimethylpolysiloxane, ethoxylated fatty alkanolamide, water, fragrances, dyes, preservatives, and any other suitable chemicals are mixed together to create a final formulation. Subsequently, the solution may be diluted before its application. An example of a non-limiting range of dilution is between approximately 1 part formula and approximately 50 parts water and approximately 1 part formula and approximately 200 parts water.

The following Table 2 represents a preferred embodiment of the polish composition. Unless otherwise noted, all parts, percentages, and ratios reported in the following table are on a weight basis, and all reagents used in the table were obtained, or are available, from chemical suppliers, or may be synthesized by conventional techniques.

TABLE 2

| Ingredient | Preferred Wt % Range |
| --- | --- |
| aliphatic hydrocarbon compound (non-aromatic) | 14.00 |
| octamethylcyclopentasiloxane (D4, a non-toxic silicone additive) | 7.76 |
| decamethylcyclopentasiloxane (cyclomethicone, fragrance solvent) | 5.13 |
| polydimethylsiloxane (PDMS, Dimethicone, a non-toxic silicone additive) | 1.68 |
| amino alkoxy dimethylpolysiloxane (an amino functional siloxane) | 0.62 |
| ethoxylated fatty alkanolamide | 0.5 |
| water | 69.70 |
| dye (coloring) | 0.01 |
| fragrance | 0.5 |
| preservative | 0.10 |

This particular polish composition has the advantage of providing the user with a composition for waxing wet surfaces of vehicles with minimal time and effort. Other wax systems when applied with significant water do not adhere well to paint surfaces, which tend to produce streak marks. Additionally, the particular preferred composition described above provides durable gloss forming chemistry that would be extremely hard to remove with conventional application methods. While wet surfaces of a car typically include only painted areas, this particular preferred composition also can be applied to all other vehicle surfaces without limitation such as chrome, plastic, rubber, and glass.

Another embodiment of the present invention is a method polishing a wet surface using the polish. The method is preferably used to polish smooth wet surfaces, such as a car that has just been washed. The method preferably includes the steps of: wetting a towel or other type of polisher; wringing the towel or otherwise removing the excess water from the wet polisher; pouring, spraying, or otherwise applying the polish to the wet polisher; rubbing the polish into the clean wet surface until the polish is no longer visible; and drying the clean wet surface with a drying implement to remove any excess polish.

After a surface has been washed, such as a wet vehicle surface, water is applied to a polisher. The polisher is typically a car polishing tool or electric polisher such as an orbital or dual-action polisher. However, any type of polisher may be used without deviating form the scope of the invention.

Excess water is then removed from the wet polisher, and the polish composition of the present invention is applied to the polisher. The polish composition may be applied to the polisher manually by hand or automatically by any type of machine or device.

The user or machine then generally rubs the wet polisher with the polish composition onto the clean surface. This may be accomplished by hand or tooling. When polishing by hand, the user typically is able to get into tight areas and around trim that a machine polisher cannot do. Alternatively, when waxing with a machine polisher, larger areas are typically performed in a short amount of time. Additionally, the machine polisher can also apply the polish composition much more evenly than you can apply by hand.

As a film of the polish composition is deposited onto the wet surface, the surface and the polisher typically move relative to each other. The user would dry the surface with a drying implement or tool, preferably with thick, soft and plush high-pile microfiber towel, or, without limitation, a towel, rag, or ordinary woven fabric. Preferably, using high quality microfiber, the user takes his or her hands and folds the drying implement over to increase the thickness of the towel. The user may then remove any composition residue with a final polish to reveal a freshly waxed shine. It should be noted that the polish composition is not added to the rinsing water as taught by conventional tunnel type car washes or applied to a dry surface.

Although a painted metallic surface is the typical surface waxed, shined, or polished with the polish and method of the present invention, it should be understood that the present invention may be used to polish any surface, including chrome, plastic, rubber, or glass.

Using the composition of the present invention and/or the method of the present invention allows a user to save a significant amount of time in polishing a car. Time is saved by not having to let the car dry. Time is also saved by not having to feverishly rub a thick coat of the wax or polish into the surface and then wait until it is haze dry. Essentially, a car can be polished in just slightly more time than it would take to dry the car.

The foregoing description of the preferred embodiment of the invention has been presented for the purposes of illustration and description. While multiple embodiments are disclosed, still other embodiments of the present invention will become apparent to those skilled in the art from the above detailed description, which shows and describes illustrative embodiments of the invention. As will be realized, the invention is capable of modifications in various obvious aspects, all without departing from the spirit and scope of the present invention. Accordingly, the detailed description is to be regarded as illustrative in nature and not restrictive. Also, although not explicitly recited, one or more embodiments of the invention may be practiced in combination or conjunction with one another. Furthermore, the reference or non-reference to a particular embodiment of the invention shall not be interpreted to limit the scope the invention. It is intended that the scope of the invention not be limited by this detailed description, but by the claims and the equivalents to the claims that are appended hereto.

What is claimed is:

1. A polishing composition comprising:
    an aliphatic hydrocarbon component in an amount of from 5.0 to 30.0 percent by weight based on a total weight of said composition;
    an octamethylcyclopentasiloxane component in an amount of from 2.0 to 10.0 percent by weight based on a total weight of said composition;
    a decamethylcyclopentasiloxane component in an amount of from 2.0 to 10.0 percent by weight based on a total weight of said composition;
    a polydimethylsiloxane component in an amount of from 0.5 to 4.0 percent by weight based on a total weight of said composition;
    an amino alkoxy dimethylpolysiloxane component in an amount of from 0.1 to 2.0 percent by weight based on a total weight of said composition;
    an ethoxylated fatty alkanolamide component in an amount of from 0.1 to 2.0 percent by weight based on a total weight of said composition; and
    a water in an amount of from 45 to 90 percent by weight based on a total weight of said composition.

2. The polishing composition of claim 1, further comprising:
    a dye in an amount from 0.001 to 0.025 percent by weight based on a total weight of said composition.

3. The polishing composition of claim 1, further comprising:
    a fragrance in an amount from 0.1 to 2.5 percent by weight based on a total weight of said composition.

4. The polishing composition of claim 1, further comprising:
    a preservative in an amount from 0.01 to 0.25 percent by weight based on a total weight of said composition.

5. The polishing composition of claim 1, wherein said aliphatic hydrocarbon compound is comprised of one or more petroleum distillates.

6. The polishing composition of claim 5, wherein said one or more petroleum distillates are selected from the group consisting of straight chain hydrocarbons and cyclic hydrocarbons.

7. The polishing composition of claim 6, wherein said one or more petroleum distillates have between nine and seventeen carbons.

8. The polishing composition of claim 1, wherein said aliphatic hydrocarbon compound, said octamethylcyclopentasiloxane, and said decamethylcyclopentasiloxane provide solubilization of said polydimethylsiloxane and said amino alkoxy dimethylpolysiloxane.

9. The polishing composition of claim 8, wherein said polishing composition is applied to a wet surface;
    wherein said aliphatic hydrocarbon compound, said octamethylcyclopentasiloxane, and said decamethylcyclopentasiloxane evaporate after application to said wet surface; and
    said polydimethylsiloxane remains on a wet surface as a liquid and fills in a plurality of microcrevices on said wet surface.

10. The polishing composition of claim 1, wherein said aliphatic hydrocarbon compound, said octamethylcyclopentasiloxane, and said decamethylcyclopentasiloxane reduce friction during application of said polishing composition to a wet surface.

11. The polishing composition of claim 1, wherein said ethoxylated fatty alkanolamide is an emulsifier.

12. A method of polishing a wet surface, comprising the steps:
    providing a clean wet surface;
    providing a wet polisher;
    removing an excess water from said wet polisher;
    applying a polish to said wet polisher;
    rubbing said polish into said clean wet surface;
    drying said clean wet surface with a drying implement and wherein said polish is comprised of:
    an aliphatic hydrocarbon compound in an amount of from 5.0 to 30.0 percent by weight based on a total weight of said polish;
    an octamethylcyclopentasiloxane in an amount of from 2.0 to 10.0 percent by weight based on a total weight of said polish;
    an decamethylcyclopentasiloxane in an amount of from 2.0 to 10.0 percent by weight based on a total weight of said polish;
    an polydimethylsiloxane in an amount of from 0.5 to 4.0 percent by weight based on a total weight of said polish;
    an amino alkoxy dimethylpolysiloxane in an amount of from 0.1 to 2.0 percent by weight based on a total weight of said polish;
    an ethoxylated fatty alkanolamide in an amount of from 0.1 to 2.0 percent by weight based on a total weight of said polish; and
    water in an amount of from 45 to 90 percent by weight based on a total weight of said polish.

13. The method of polishing a wet surface of claim 12, wherein said aliphatic hydrocarbon compound is comprised of one or more petroleum distillates.

14. The method of polishing a wet surface of claim 13, wherein said one or more petroleum distillates are selected from the group consisting of straight chain hydrocarbons and cyclic hydrocarbons.

15. The method of polishing a wet surface of claim 14, wherein said one or more petroleum distillates have between nine and seventeen carbons.

16. The method of polishing a wet surface of claim 12, wherein said aliphatic hydrocarbon compound, said octamethylcyclopentasiloxane, and said decamethylcyclopentasiloxane provide solubilization of said polydimethylsiloxane and said amino alkoxy dimethylpolysiloxane.

17. The method of polishing a wet surface of claim 16, wherein said aliphatic hydrocarbon compound, said octamethylcyclopentasiloxane, and said decamethylcyclopentasiloxane evaporate after application to said polished surface; and said polydimethylsiloxane remains on a polished surface as a liquid and fills in a plurality of microcrevices on said polished surface.

18. The method of polishing a wet surface of claim 17, wherein said aliphatic hydrocarbon compound, said octamethylcyclopentasiloxane, and said decamethylcyclopentasiloxane reduce friction during application of said polish to said wet surface.

19. The method of polishing a wet surface of claim 12, wherein said polish further comprises:
- a dye in an amount from 0.1 to 2.5 percent by weight based on a total weight of said polish;
- a fragrance in an amount from 0.1 to 2.5 percent by weight based on a total weight of said polish; and
- a preservative in an amount from 0.1 to 2.5 percent by weight based on a total weight of said polish.

* * * * *